May 30, 1967 I. S. BLONDER 3,323,042
APPARATUS FOR SWITCHING RADIO FREQUENCY ENERGY THROUGH PLURAL CIRCUIT CONNECTIONS TO DISPLAY DEVICE
Filed Dec. 27, 1962
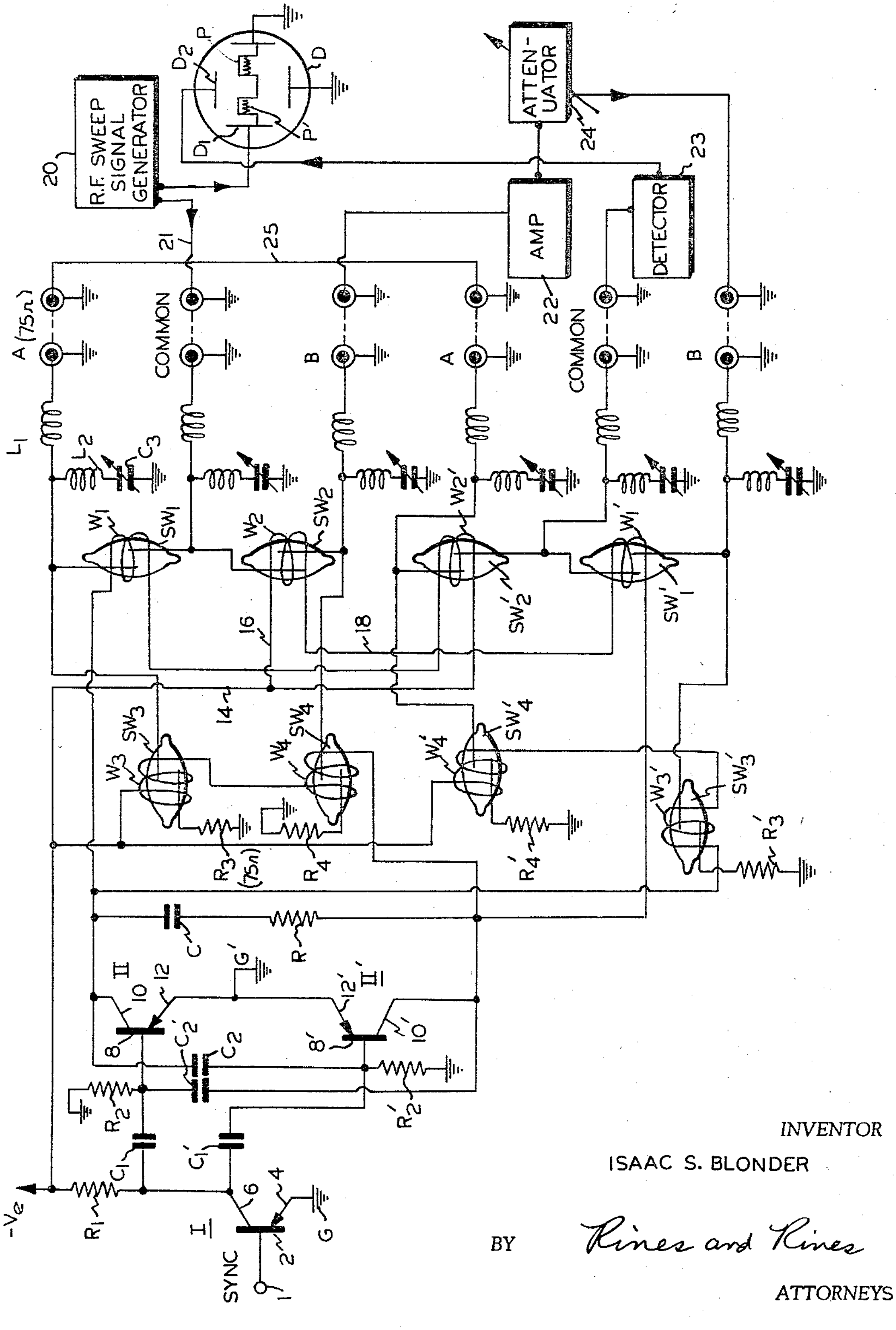
INVENTOR
ISAAC S. BLONDER
BY Rines and Rines
ATTORNEYS 3,323,042

APPARATUS FOR SWITCHING RADIO FREQUENCY ENERGY THROUGH PLURAL CIRCUIT CONNECTIONS TO DISPLAY DEVICE

Isaac S. Blonder, West Orange, N.J., assignor to Blonder Tongue Electronics, Newark, N.J., a corporation of New Jersey Filed Dec. 27, 1962, Ser. No. 247,569
14 Claims. (Cl. 324—57)

The present invention relates to switching circuits and, more specifically, to switchers particularly adapted for radio-frequency operation, as for such purposes as enabling the observation of gain and attenuation measurements of widely separated bands of radio frequencies.

While numerous complex and expensive radio-frequency switching circuits have been employed for such purposes as measuring switched bands of radio frequencies, there has been a need for a simple and inexpensive switching system of this character that can, if desired, be operated directly from the sixty-cycle mains, and that employs reliable switching components that are not subject to change with prolonged operation. It is to the solution of this problem that the present invention is, accordingly, directed.

Another object of the invention is to provide a novel switching circuit of more general utility as well.

Other and further objects will be discussed hereinafter and will be more particularly pointed out in connection with the appended claims, the invention being described by reference to the accompanying drawing, the single figure of which is a schematic circuit diagram of a preferred embodiment of the invention.

Synchronizing signals, such as the sixty-cycle alternating-current mains voltage is applied at input terminals 1–G, between the base 2 and emitter 4 of a first input transistor stage I, as of the 2N270 type. Collector voltage is applied to the collector 6 through resistor $R_1$ from a negative source "$-V_e$," such as minus six volts. The collector 6, in turn, feeds through similar coupling capacitors $C_1$ and $C_1'$ to the respective bases 8 and 8′ of a pair of multivibrator transistor switching relays (as of the 2N270 type), shown at II and II′, respectively. The collector 10 of relay II is coupled at $C_2$ to the base 8′ of relay II′, and the collector 10′ of relay II′ similarly is coupled through $C_2'$ to the base 8 of the transistor stage II. The coupling capacitors, for the circuit parameters above given, may be about 5 $\mu$farads. The emitters 12 and 12′ are conected to a common ground terminal G′, and shunt resistors $R_2$ and $R_2'$ are provided, connected between the respective bases 8 and 8′ and corresponding ground terminals. Differentiation of the input signal is effected by circuit elements $C_1$–$R_2$ and $C_1'$–$R_2'$ (having, for example, capacitive values of about 0.1 $\mu$farad and resistance values of 5,000 ohms) to effect peaking of the wave form to trigger the multivibrator II–II′. The resulting alternating opposite-phase switching square wave impulses at the collector circuit conductors 10 and 10′ are fed to the upper and lower terminals, respectively, of windings $W_1$ and $W_1'$ for operating electromagnetically controlled pairs of two-terminal mechanical switching reed contact members indicated at $SW_1$ and $SW_1'$.

It has been found that extremely reliable radio-frequency-transmitting switching action can be obtained through such simple mechanical switching reed contact members greatly reducing wear and erratic-operation problems. Suitable devices of this character are the RCA type electromagnetic reeds RE2100 ("Minireed") contained within gas-filled enclosure capsules. The lower terminal of winding $W_1$ is connected to the upper terminal of a further winding $W_2'$, connected with a further similar switching device $SW_2'$, the lower terminal of which connects by conductor 14 to the "$-V_e$" terminal. The conductor 14, in turn, connects at 16 to the upper terminal of still another winding $W_2$ that controls a similar switching member $SW_2$, the lower terminal of which connects at 18 to the upper terminal of winding $W_1'$. Thus the windings $W_1$, $W_2'$, $W_2$ and $W_1'$ are connected in series between the collectors 10 and 10′ of the multivibrator relays II and II′.

The pairs of reeds or switching contacts $SW_1$, $SW_2$, $SW_1'$ and $SW_2'$ connect to upper and lower sets of output-circuit outlets labelled A, B and COMMON, as follows. The left-hand reed contact of $SW_1$ connects to coaxial output jack A, being provided with a shunt trap $L_2$–$C_3$ for shunt compensatory peaking at the high end of the band to be switched, and a series inductance $L_1$ compensating for the shunt capacitance of the switch $SW_1$, to ground. The right-hand reed contact of $SW_1$ and the left-hand reed contact of $SW_2$ connect with the upper COMMON output-circuit terminal with similar series inductance and shunt trapping circuit elements. The right-hand contact of $SW_2$ similarly connects to the upper output outlet B. The right-hand contact of $SW_1'$ connects in the same manner to the lower outlet B, and the left-hand contact of $SW_1'$ and the right-hand contact of $SW_2'$ connect to the lower COMMON terminal. Lastly, the left-hand reed contact of $SW_2'$ connects in the same manner to the lower outlet jack A.

It has been found important to cause the windings $W_1$, $W_2$, $W_1'$ and $W_2'$ driving or controlling the switches $SW_1$, $SW_2$, $SW_1'$ and $SW_2'$ to appear as resistive loads to the collector output circuits of multivibrator stages II and II′ for maintaining reliable switching operation of the multivibrator. To this end, the time constant of capacitor C and resistor R, shunting collectors 10 and 10′, has been found to be quite critical in order to tune out the reactive inductance of the windings $W_1$, $W_2$, $W_1'$, $W_2'$, as later discussed.

In order to illustrate the operation of the system above-described, a typical application of the same is shown in connection with visual observation and measurement upon a cathode-ray-tube oscilloscope or other indicator or display device D, of the gain and attenuation of the bands-to-be-switched. A sweep signal generator 20 applies its radio-frequency energy output at 21 to the upper COMMON terminal and the sweep-frequency signal to the left-hand horizontal deflector plate $D_1$ of the oscilloscope D. An amplifier 22 connects with the upper terminal B, and feeds an attenuator 24 that, in turn, connects with the lower terminal B. A detector 23 is inserted between the lower COMMON terminal and the upper vertical deflection plate $D_2$, in this illustrative application.

The swept radio-frequency band to be observed or measured, as generated at 20, is fed at 21 through the upper COMMON terminal through alternatively repetitively closed reed contacts. $SW_1$ and $SW_2$. During the closing of $SW_1$ and $SW_2'$ in response to an energizing square wave from the collector 10 of relay II of the multivibrator II–II′, the swept input is applied via $L_1$ to upper terminal A, and thence by conductor 25 to lower terminal A. Connection continues through closed switch $SW_2'$, the lower COMMON terminal, and detector 23 to the vertical deflection plate $D_2$ of the oscilloscope display D. A detected response or envelope of the swept bands will thus be displayed at D. In the case of, for example, the VHF television band, two wave-envelopes representing the 54–88 and the 174–216 megacycle bands will appear as shown at P.

During the closing of $SW_1'$ and $SW_2$, on the other hand, the swept signal input is applied from the upper COMMON terminal by way of $SW_2$ to the upper B terminal, and thence through amplifier 22 and attenuator 24 to the lower B terminal. From the lower B terminal, the signal continues through $SW_1'$ and the lower COMMON terminal to the detector 23 and thence to the deflection plate $D_2$. By adjusting the attenuator 24 such that the output level corresponds to the detected sweep level, with the attenuation substantially equal to the actual amplifier gain, a waveform P' appears on the oscilloscope D permitting the measurement of the gain of the amplifier and attenuator and also visualizing of the sweep response.

For the purposes above stated, for example, highly successful operation has been attained with windings $W_1$, $W_1'$, $W_2$, $W_2'$ of about 1500 turns of number 38 wire (30 mils at 2½ volts), and with the capacitor C having a value of about 0.5 μfarad and the resistor R, a value of about 820 ohms, to provide the tuning out of the inductance of the windings, before described. The series inductance elements, such as $L_1$, may be adjusted to compensate for the shunt capacitance of the switches $SW_1$, $SW_2$, $SW_1'$, $SW_2'$ over the band through the VHF region; while the traps, such as L2–C3 may be tuned to 1000 megacycles, more or less, to provide compensation at the high end of the UHF band. The terminals A, B and COMMON may present a 75-ohm impedance.

During the switching that activates terminals A, the inputs or terminals B are unterminated. This may reflect a high impedance that can cause spurious response in view of the capacitive coupling of the switch windings not being energized or switched closed. Minimizing of such an effect can be accomplished with the aid of supplementary switching windings atnd contact reeds $SW_3$, $SW_3'$, $SW_4$, $SW_4'$ connected between the collectors 10 and 10' in the opposite manner to the windings $W_1$, $W_2$, $W_1'$, $W_2'$, as shown, to provide 75-ohm matching at resistors $R_3$, $R_4$, $R_3'$, $R_4'$, for the unswitched contact members.

While the electromagnetic contact reed switching devices are preferred for the above-mentioned reasons, diode or other switching devices controlled by the alternate outputs at the collectors 10 and 10' could be employed, and further modifications will also occur to those skilled in the art; such being considered to fall within the spirit and scope of the invention as defined in the appended claims.

What is claimed is:

1. In combination, two pairs of two-terminal switching devices, a pair of conductors, means for producing opposite-phase switching impulses at said conductors, the switching devices of each pair having means connected to said conductors, respectively, and responsive to said switching impulses, for operating the switching devices of each pair alternately, a set of three outlet circuits associated with each pair of switching devices, a first outlet circuit of each set being connected in common to a terminal of each switching device of the associated pair, the second and third outlet circuits of each set being respectively connected to the other terminals of the associated pair of switching devices, means connecting the second outlet circuits of each set and connecting the third outlet circuits of each set, respectively, means for applying radio frequency energy to the common outlet circuit of one of the sets and means coupled to the common outlet circuit of the other set for evidencing a signal.

2. The combination of claim 1, said signal-evidencing means comprising means for detecting radio frequency energy.

3. The combination of claim 2, said means connecting the third outlet circuits comprising an amplifier and an attenuator.

4. The combination of claim 3, said attenuator having means for adjusting its attenuation substantially to compensate for the gain of said amplifier, said signal-evidencing means further comprising display means connected to said radio frequency energy applying means and to said detector.

5. The combination of claim 4, said radio frequency energy applying means comprising a sweep signal generator.

6. The combination of claim 1, said switching devices comprising contact members and said operating means being electromagnetic.

7. The combination of claim 6, said contact members being disposed in a gaseous enclosed medium.

8. The combination of claim 6, the operating means for each switching device comprising a winding, the windings of one switching device of each pair being connected in series and the windings of the other switching device of each pair being connected in series.

9. The combination of claim 8, said impulse-producing means comprising a multivibrator having outputs connected to said conductors.

10. The combination of claim 6, each outlet circuit having means for compensating for the shunt capacitance of the connected switching devices.

11. The combination of claim 6, further comprising means for impedance-terminating one switching device of each pair during operation of the other switching device of each pair.

12. The combination of claim 11, said impedance-terminating means comprising further two terminal switching devices, one associated with each of the aforementioned switching devices and operated alternately therewith.

13. The combination of claim 6, each outlet circuit having shunt-peaking compensation means.

14. The combination of claim 6, the operating means of each switching device comprising a winding, said conductors having means connected thereto for tuning out the inductive reactance of said windings.

References Cited

UNITED STATES PATENTS 2,626,980 1/1953 Balde et al. ---------- 324—57

RUDOLPH V. ROLINEC, *Primary Examiner.*

WALTER L. CARLSON, *Examiner.*

W. H. BUCKLER, E. E. KUBASIEWICZ, *Assistant Examiners.*